US008277757B2

(12) United States Patent
Kelly et al.

(10) Patent No.: US 8,277,757 B2

(45) Date of Patent: Oct. 2, 2012

(54) PIPETTE TIP MOUNTING SHAFT

(75) Inventors: Terrence Kelly, Lowell, MA (US); Richard Cote, Bolton, MA (US); Gregory Mathus, Concord, MA (US)

(73) Assignee: Integra Biosciences Corp., Hudon, NH (US)

( * ) Notice: Subject to any disclaimer, the term of this patent is extended or adjusted under 35 U.S.C. 154(b) by 388 days.

(21) Appl. No.: 12/568,801

(22) Filed: Sep. 29, 2009

(65) Prior Publication Data

US 2011/0076205 A1 Mar. 31, 2011

(51) Int. Cl.
*B01L 3/00* (2006.01)
*G01F 19/00* (2006.01)
*G01F 25/00* (2006.01)

(52) U.S. Cl. ........................................ 422/501; 73/1.74

(58) Field of Classification Search .................. 422/100, 422/501
See application file for complete search history.

(56) References Cited

U.S. PATENT DOCUMENTS

| | | | |
|---|---|---|---|
| 4,072,330 | A | 2/1978 | Brysch |
| 4,721,680 | A | 1/1988 | Jeffs et al. |
| 4,748,859 | A | 6/1988 | Magnussen, Jr. et al. |
| 4,824,641 | A | 4/1989 | Williams |
| 4,917,274 | A | 4/1990 | Asa et al. |
| 4,961,350 | A | 10/1990 | Tennstedt |
| 4,999,164 | A | 3/1991 | Puchinger et al. |
| 5,032,343 | A | 7/1991 | Jeffs et al. |
| 5,200,151 | A | 4/1993 | Long |
| 5,232,669 | A | 8/1993 | Pardinas |
| 5,306,510 | A | 4/1994 | Meltzer |
| 5,580,529 | A | 12/1996 | DeVaughn et al. |
| 5,736,105 | A | 4/1998 | Astle |
| 5,948,359 | A | 9/1999 | Kaira et al. |
| 6,168,761 | B1 | 1/2001 | Kelly et al. |
| 6,171,553 | B1 | 1/2001 | Petrek |
| 6,197,259 | B1 | 3/2001 | Kelly et al. |
| 6,248,295 | B1 | 6/2001 | Petrek |
| 6,582,664 | B2 | 6/2003 | Bevirt et al. |
| 6,596,240 | B2 | 7/2003 | Taggert et al. |

(Continued)

FOREIGN PATENT DOCUMENTS

DE 10229788 1/2004

(Continued)

OTHER PUBLICATIONS

"Pipetman Concept", Gilson, Aug. 2005.

*Primary Examiner* — Sam P Siefke
*Assistant Examiner* — Bryan Kilpatrick
(74) *Attorney, Agent, or Firm* — Andrus, Sceales, Starke & Sawall, LLP

(57) ABSTRACT

A pipette tip mounting shaft includes outwardly circumferentially extending locking lobes over which the pipette tip collar is mounted. The locking lobes preferably include an inclining ramp portion that gently flexes and distorts the pipette tip collar out-of-round as the mounting shaft is inserted into the pipette tip, rather than the stretching tip collar. Each locking lobe also includes a declining ramp portion which extends upward along the mounting shaft. The peak of the lobes is preferably curved. When the pipette tip is fully mounted on the mounting shaft, a locking ring on the inside surface of the tip collar engages the declining ramp of the lobes to provide an over-center engagement, however, the required ejection force is small.

19 Claims, 7 Drawing Sheets

U.S. PATENT DOCUMENTS

| | | | |
|---|---|---|---|
| 6,737,023 | B1 | 5/2004 | Kelly et al. |
| 6,745,636 | B2 | 6/2004 | Rainin et al. |
| 6,780,381 | B2 | 8/2004 | Yiu |
| 6,967,004 | B2 | 11/2005 | Rainin et al. |
| 6,973,845 | B2 | 12/2005 | Bell |
| 6,977,062 | B2 | 12/2005 | Cronenberg |
| 7,033,543 | B1 | 4/2006 | Panzer et al. |
| 7,335,337 | B1 | 2/2008 | Smith |
| 7,662,343 | B2 | 2/2010 | Mathus et al. |
| 7,662,344 | B2 | 2/2010 | Mathus et al. |
| 2001/0043885 | A1 | 11/2001 | Wanner |
| 2002/0094302 | A1 | 7/2002 | Taggart et al. |
| 2002/0146353 | A1 | 10/2002 | Bevirt et al. |
| 2003/0082078 | A1 | 5/2003 | Rainin et al. |
| 2003/0165408 | A1 | 9/2003 | Takeda et al. |
| 2003/0219359 | A1 | 11/2003 | Lenz et al. |
| 2004/0071602 | A1 | 4/2004 | Yiu |
| 2005/0069460 | A1 | 3/2005 | Lohn |
| 2005/0175511 | A1 | 8/2005 | Cote et al. |
| 2005/0255005 | A1 | 11/2005 | Motadel |
| 2005/0265900 | A1 | 12/2005 | Gard et al. |
| 2006/0171851 | A1 | 8/2006 | Motadel |
| 2006/0177352 | A1 | 8/2006 | Ziegmann et al. |
| 2006/0233669 | A1 | 10/2006 | Panzer et al. |
| 2008/0095671 | A1 * | 4/2008 | Mathus et al. ................ 422/100 |
| 2008/0286157 | A1 | 11/2008 | Mathus et al. |

FOREIGN PATENT DOCUMENTS

| | | |
|---|---|---|
| DE | 102006036764 | 2/2008 |
| EP | 0148333 | 9/1989 |
| EP | 0494735 | 7/1991 |
| EP | 1319437 | 6/2003 |
| EP | 186229 | 12/2007 |
| EP | 0701865 | 7/2009 |
| WO | 200027530 | 5/2000 |
| WO | 2006123319 | 11/2006 |

* cited by examiner

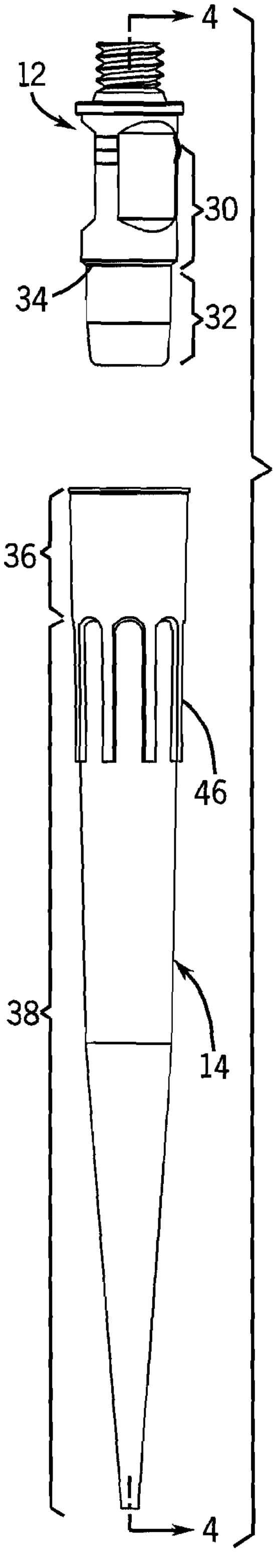
FIG. 3
FIG. 4
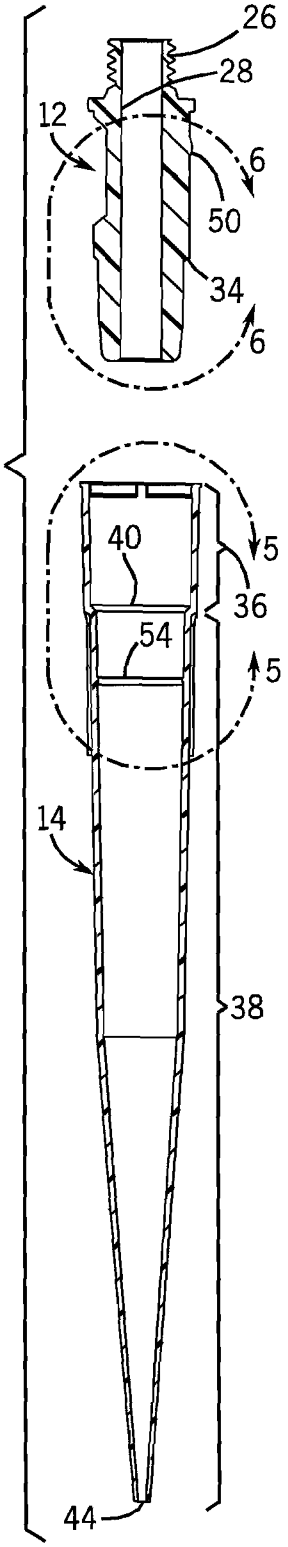
FIG. 5
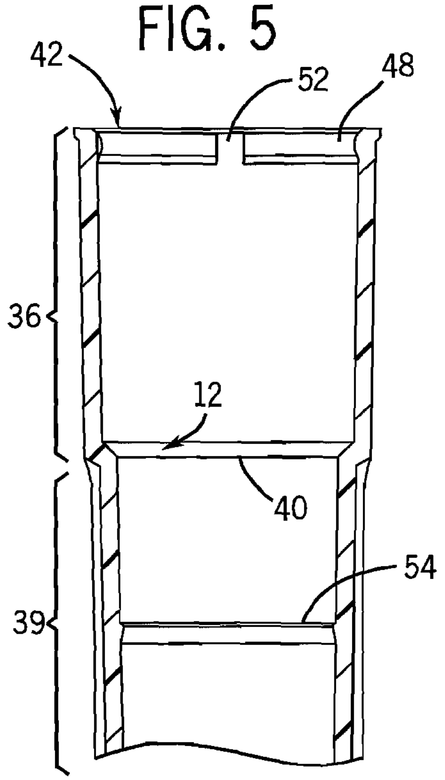

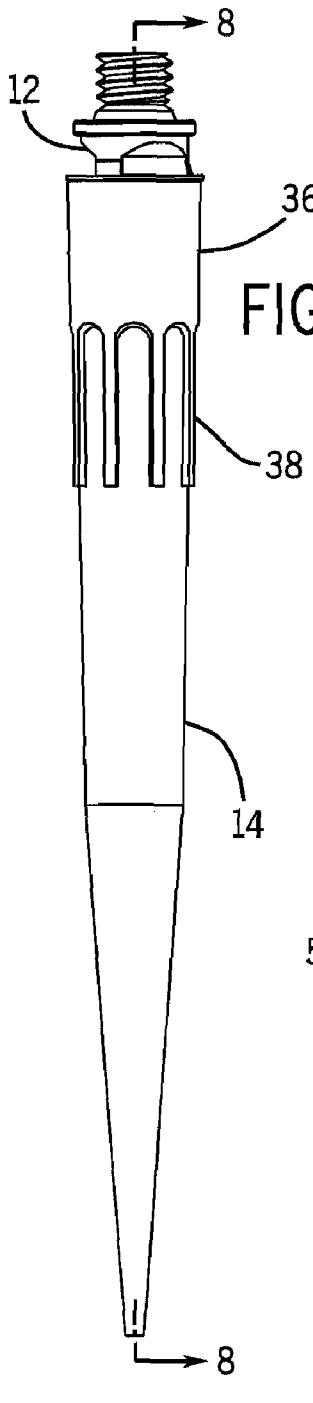
FIG. 7
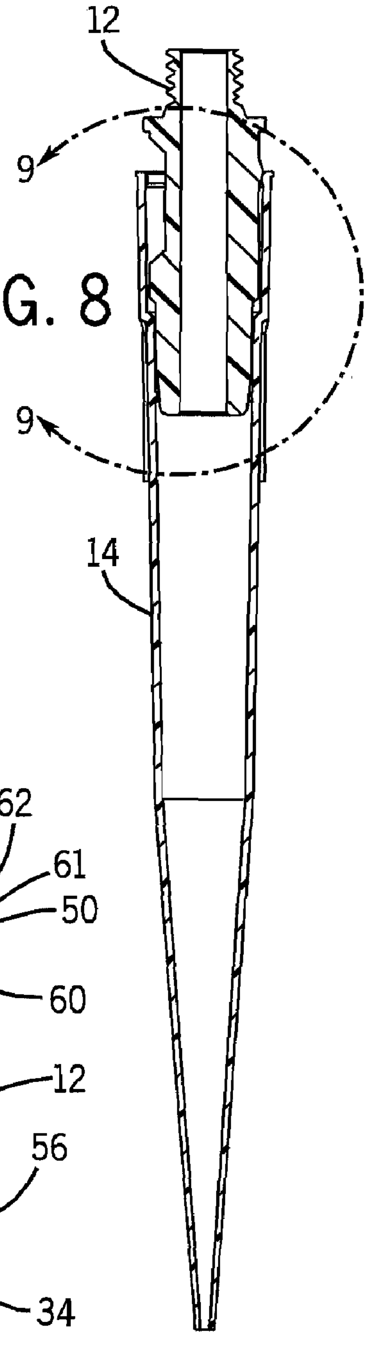
FIG. 8
FIG. 6
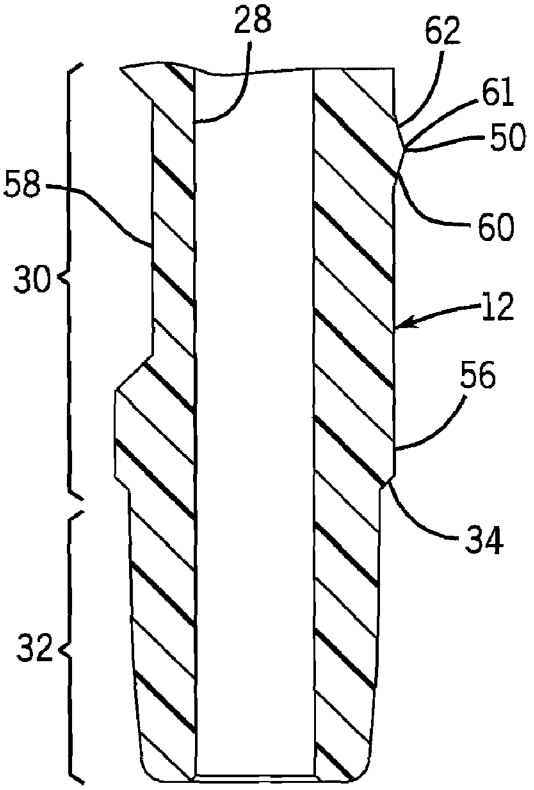

FIG. 9
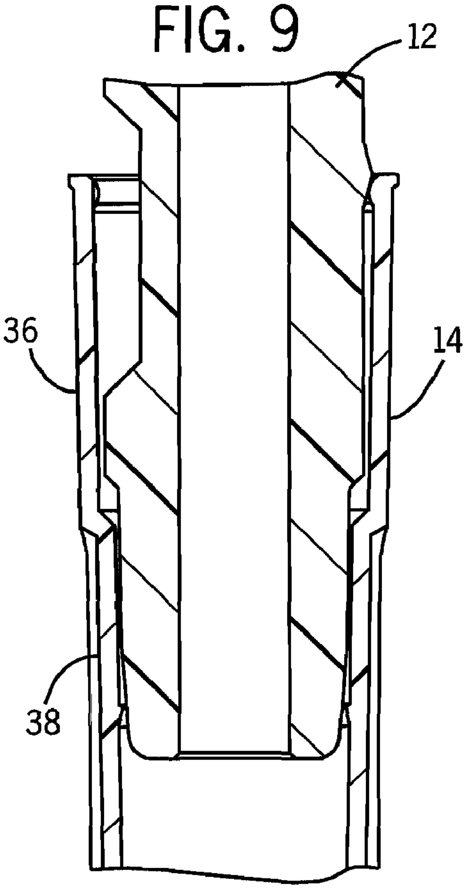
FIG. 10
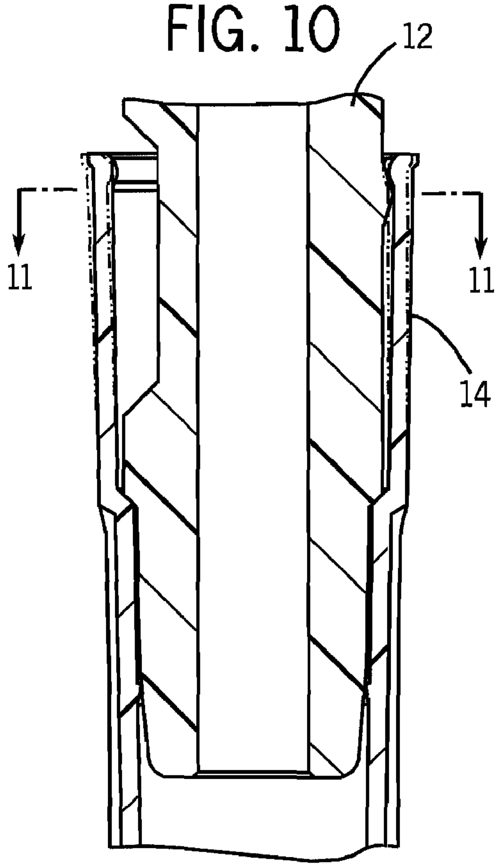
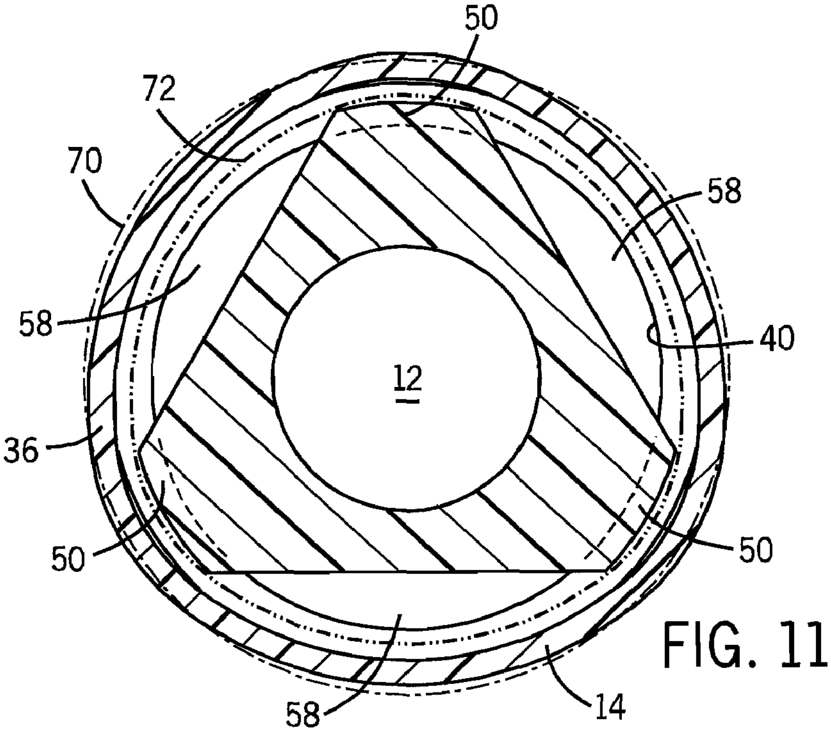
FIG. 11

PIPETTE TIP MOUNTING SHAFT

FIELD OF THE INVENTION

The invention relates to improvements in pipettors and automated liquid handling systems. More specifically, the invention relates to the configuration of mounting shafts for disposable pipette tips which provides robust sealing engagement with low insertion and ejection forces as well as an enhanced ability to maintain the mounted tip stable on the mounting shaft and resist unintentional removal.

BACKGROUND OF THE INVENTION

The use of disposable pipette tips with handheld pipettors and automated liquid handling systems is well known. Disposable pipette tips enable repeated use of such pipetting systems to transfer different liquid reagents or different liquid samples without carryover contamination. Disposable pipette tips are normally formed of a plastic material, such as polypropylene, and have a hollow, elongated, generally conical shape. The upper end of the pipette tip typically includes a collar that is mounted to a mounting shaft on the pipetting device. This mounting shaft is sometimes called the tip fitting. The mounting shaft includes an internal bore through which air is displaced in order to aspirate liquid sample into and dispense liquid sample from the pipette tip. The distal end of the pipette tip has a small opening through which the liquid sample is received into and dispensed from the barrel of the pipette tip.

Disposable pipette tips have historically relied on tapered fits between the mounting shaft and the pipette collar, as well as sealing rings on the inside circumference of the pipette collar, to secure and seal the pipette tips to the mounting shaft. In most cases, the fit between the mounting shaft and the disposable tip is achieved by pushing the tapered mounting shaft into the tapered collar until the shaft wedges into the tip. At this point, a seal is achieved between the tip collar and the mounting shaft as a result of crushing the sealing ring and/or stretching the diameter of the collar. In addition to achieving a proper seal, it is also important that the position and orientation of the mounted tip be stable in the face of lateral momentum or slight knocking forces that are typical during normal use such as during touch-off against the sidewall of a sample vessel. In order to assure tip stability, users tend to jam the tip mounting shaft into the collar of the tip with excessive force.

Various systems have been devised to provide proper sealing and stability without requiring excessive mounting and ejection forces. The inventors' have previously filed U.S. patent application Ser. No. 11/552,384 entitled "Locking Pipette Tip and Mounting Shaft", filed on Oct. 24, 2006, Publication No. US 2008/0095671 A1, published on Apr. 24, 2008, now U.S. Pat. No. 7,662,343, issued Feb. 16, 2010, and U.S. patent application Ser. No. 11/934,381, filed on Nov. 2, 2007, also entitled "Locking Pipette Tip and Mounting Shaft", and published on Nov. 20, 2008 as US 2008/0286157 A1, now U.S. Pat. No. 7,662,344, issued Feb. 16, 2010. In these applications, the described tip mounting shaft includes a locking section having circumferentially spaced outwardly extending locking lobes located above a stop which consists of a step between the locking section and a lower sealing section located below the stepped stop. When the mounting shaft is fully inserted into the collar of a mating disposable pipette tip, the tip locks onto the mounting shaft. The bore of the pipette tip includes a circumferential shelf or shoulder separating its upper collar from the tip sealing area which is located below the circumferential shelf in the barrel of the tip. The tip collar preferably includes a locking ring located at or near the upper opening of the collar through which the mounting shaft is inserted. The dimensions of the collar, and in particular the distance between its circumferential shelf and the locking ring, are selected to match the dimensions of the mounting shaft between the stop member and a catch surface of the upper end of the locking lobes, thus locking the pipette tip in a secure, reliable position and orientation. The locking lobes preferably include an inclining ramp portion that generally flexes and distorts the pipette tip collar out of round as the mounting shaft is inserted into the pipette tip, rather than stretching the tip collar, thereby reducing the amount of insertion force needed to mount the tip. In the inventors' previous designs, the preferred tip mounting shaft has three lobes spaced equally around the mounting shaft with recessed relief portions spanning between the lobes to accommodate inward distortion of the tip collar between the lobes. As mentioned, the lobes include an inclining ramp that gently slopes between 10-20° with respect to the vertical axis of the mounting shaft. Each lobe extends outward along the ramp towards the top of the locking section of the mounting shaft until it turns abruptly inward to form a catch surface. When the mounting shaft is fully inserted into the pipette tip, the locking ring on the pipette collar engages the catch surface as it is fitted over the peak of the lobe, thereby providing a very secure, snapped-on mount. The peak of each lobe is preferably slightly rounded to facilitate removal of the pipette tip.

While the collar of the pipette tip is flexed and distorted out-of-round when the mounting shaft is inserted in the pipette tip, the circumferential shelf on the pipette tip between the collar and the barrel of the tip isolates the sealing region at the upper end of the barrel from distortion The structural isolation provided by the circumferential shelf in the tip facilitates reliable sealing engagement between the lower sealing section of the tip mounting shaft and the sealing region in the upper end of the tip barrel. The above referenced applications describe various sealing arrangements including a sealing ring extending inward from the upper end of the tip barrel below the circumferential shelf to engage the sealing region on the mounting shaft below the stepped stop with an interference fit. In some embodiments, the sealing region on the mounting shaft is frustoconically shaped. In other sealing arrangements, the mounting shaft includes a groove below the stop that holds a sealing ring such as an elastomeric O-ring. The O-ring on the tip mounting shaft engages the sealing region at the top of the tip barrel when the mounting shaft is fully inserted into the tip. In each of these cases, however, the sealing region at the upper end of the tip barrel is isolated from distortion by the structural integrity of circumferential shelf on the tip located between the distorted locking collar and the round tip barrel.

As described in the above referenced patent applications, the combination of the locking lobes and the stop on the mounting shaft results in an ergonomic, over-center locking engagement that provides tactile feedback to the user of a handheld pipettor indicating that the disposable pipette tip is approaching and has been fully engaged on the mounting shaft. As the mounting shaft is pushed into the tip collar, the first point of contact is where the leading edge of the mounting shaft, i.e. the lower sealing section, enters through the circumferential shelf in the pipette tip and contacts the sealing region in the tip barrel. As the mounting shaft is further depressed into the pipette tip bore, the interference for the seal increases simultaneously as the inclining ramp areas of the locking lobes on the mounting shaft engage the tip collar to distort the upper portion of the collar out-of-round. While the overall insertion force is relatively light and ergonomic, the force increases noticeably and provides tactile feedback to the user that the tip is almost fully mounted. This increase in insertion force continues until the stop member on the mounting shaft engages the circumferential shelf on the pipette tip to abruptly stop further movement of the mounting shaft into the tip, at which point the lobes also snap under the locking ring in the collar bore with the locking ring engaging the catch surface on the respective lobes. Thus, alerting the user not to use additional, excessive force to mount the tip. These interrelated mounting conditions result in a secure, stable mount with consistent sealing. In addition, as explained in the above-referenced applications, the flexing of the collar into a distorted shape stores energy in the collar when it is mounted. To eject the tip from the mounting shaft, downward ejection force is required to release the locking ring on the collar from the catch surface on the locking lobes on the mounting shaft. In general, the downward ejection force causes the collar to distort further outward at the lobes so that the locking ring can slide over the catch surface and the rear of the respective lobes, and then release downward. When the tip is released from the catch surface on the lobes, the combination of the downward force from the pipettor stripping mechanism and the release of the stored energy in the distorted tip collar tend to throw the tip from the mounting shaft, thereby facilitating convenient ejection of the tips from the mounting shaft after use.

While the above top mounting system provides a significant advancement in the art, in some circumstances, it may be desirable to further lessen tip insertion and ejection forces, such as is particularly desirable when using handheld multi-channel pipettors. The prior referenced '384 application discloses two embodiments for further reducing tip insertion and ejection forces. In one embodiment, the diameter of the mounting shaft is reduced below the sealing area so that there is little or no interference with a circumferential sealing ring extending inward from the tip barrel as the mounting shaft is initially inserted. The mounting shaft is provided with a frustoconically shaped sealing section that extends outward to engage the sealing ring on the tip barrel. In another embodiment, the diameter of the mounting shaft is again reduced below the section area so that there is little or no interference as the mounting shaft is initially inserted but the mounting shaft is also provided with annular groove that contains an O-ring seal to effectuate a reliable seal with the pipette tip.

It is a primary object of the present invention to provide more significant reduction in the required ejection force without substantially affecting the stability of the mounted pipette tips.

SUMMARY OF THE INVENTION

The invention relates to the configuration of circumferentially spaced, outwardly extending locking lobes on a pipette tip mounting shaft. As in the referenced patent applications, each of the locking lobes on the pipette tip mounting shaft includes an inclining ramp portion that angles outward as the inclining ramp extends upward along the mounting shaft. The purpose of the inclining ramp portion of the lobes is to facilitate distortion of the pipette tip collar out-of-round as the mounting shaft is inserted into the pipette tip. Relief portions spanning between the outwardly extending lobes and recessed with respect to the lobes accommodate inward distortion of the pipette tip collar between the lobes as in the prior art. However, in accordance with the present invention, each of the locking lobes includes a peak portion that is located at a maximum outward distance from the longitudinal axis of the mounting shaft as well as a declining ramp portion that angles inward towards the longitudinal axis on the mounting shaft as it extends upward away from the peak of the lobe along the mounting shaft. In other words, the abrupt catch surface on the locking lobes described in the above-referenced patent applications is replaced with a gently declining ramp portion. Preferably, the peak portion of the lobe is curved with a radius of between 0.006 and 0.015 inches depending on the pipette tip size. Preferably, the declining ramp portion of the lobe gently slopes between 10-20° with respect to the vertical axis of the mounting shaft. When a mounting shaft with this configuration is used with pipette tips having a locking ring near the rim of the collar opening, the location of the peak of the lobe is selected so that the locking ring engages the declining ramp portion of the lobe beyond the peak. It has been found that this configuration provides a secure, stable mounting configuration yet substantially reduces the required ejection forces as compared to the previous described configurations in which the lobes have abrupt catch surfaces.

Preferably, the mounting shaft has three locking lobes. The locking lobes are also preferably narrower than those described in the prior patent applications filed by the inventors. It is preferred that at the peak portion of the lobes, the lobes comprise no more than 15% of the circumference of the mounting shaft with the remaining portion of the circumference of the mounting shaft being consumed by relief portions between the lobes. This configuration with relatively thin locking lobes helps to reduce friction between the tip collar and the mounting shaft and reduce insertion and ejection forces, while at the same time providing stable over-center mounting of the tip over the lobes.

The sealing section of the mounting shaft below the stop can take various forms including those described in the above referenced co-pending U.S. patent application Ser. No. 11/552,384 entitled "Locking Pipette Tip and Mounting Shaft" filed on Oct. 24, 2006 by Greg Mathus, Terrance Kelly and Rich Cote, now U.S. Pat. No. 7,662,343, issued Feb. 16, 2010, and U.S. patent application Ser. No. 11/934,381 also entitled "Locking Pipette Tip and Mounting Shaft" by Greg Mathus, Terrance Kelly and Rich Cote filed on Nov. 2, 2007, now U.S. Pat. No. 7,662,344, issued Feb. 16, 2010, both applications being incorporated in their entirety herein by reference. Briefly, the lower sealing section on the mounting shaft can be configured to engage a sealing ring extending inward from the inside surface of the tip barrel, can be configured with a groove and elastomeric ring on the mounting shaft which engages the inside wall of the pipette tip barrel, or can be configured with another suitable sealing arrangement. For example, although not normally preferred, in some circumstances it may be desirable to seal above the stop on the mounting shaft at a location within the lower portion of the pipette tip collar.

As described in more detail below, in reference to the drawings, the mounting shaft configuration of the present invention and in particular the dual-ramp locking lobes, significantly lowers the release force without substantially affecting stability of the tips mounted on the mounting shaft under normal operating conditions.

These and other aspects, features and advantages of the invention are now described in greater detail with reference to the accompanying drawings.

BRIEF DESCRIPTION OF THE DRAWINGS

FIG. 3 is a side elevational view of the mounting shaft and pipette tip shown in FIG. 2.

FIG. 4 is a longitudinal cross-section taken along line 4-4 in FIG. 3.

FIG. 5 is a detailed view of an area encircled by line 5-5 in FIG. 4 showing an upper locking collar, sealing area and circumferential shelf on the disposable pipette tip illustrated in FIG. 2.

FIG. 6 is a detailed view of the area encircled by line 6-6 in FIG. 4 showing a locking section, sealing section and stop member of the tip mounting shaft shown in FIG. 2.

FIG. 7 is a side elevational view showing the mounting shaft being inserted into the disposable pipette tip.

FIG. 8 is a longitudinal cross-sectional view taken along line 8-8 in FIG. 7.

FIG. 9 is a detailed view over the area encircled by line 9-9 in FIG. 8 showing insertion of the mounting shaft into the pipette tip just prior to final engagement.

FIG. 10 is a detailed view similar to FIG. 9 showing full insertion of the mounting shaft into the pipette tip.

FIG. 11 is a view taken along line 11-11 of FIG. 10 illustrating the pipette tip collar and locking ring being distorted out-of-round when the pipette tip is fully mounted onto the mounting shaft.

DETAILED DESCRIPTION OF THE INVENTION

Figure 1:
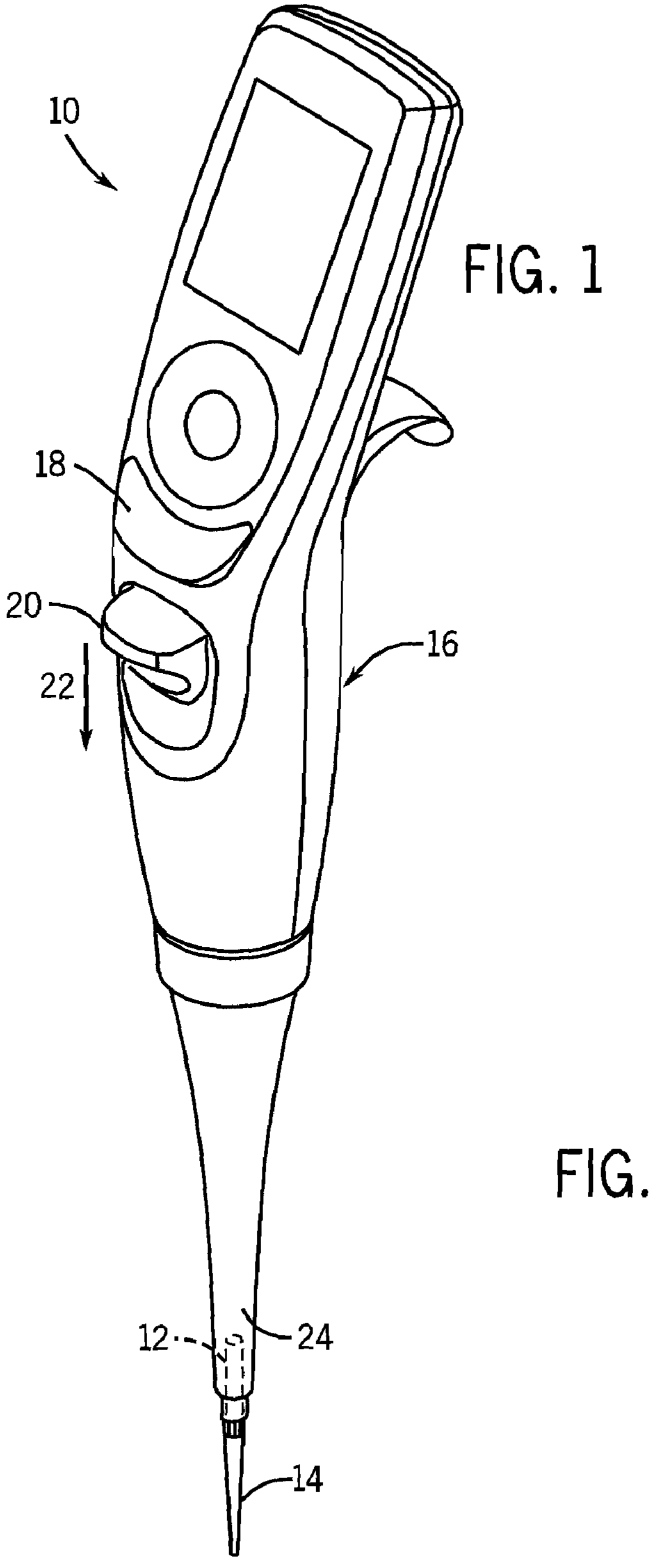
FIG. 1 is a perspective view of a handheld, electronic air displacement pipette incorporating the concepts of the present invention.

FIG. 1 illustrates a handheld, electronic air displacement pipettor 10 that incorporates a tip pipette mounting shaft 12 constructed in accordance with one embodiment of the invention. A disposable pipette tip 14 mounts to the pipette tip mounting shaft 12. Pipette tip mounting shafts 12 are also commonly referred to as tip fittings in the art.

The pipettor 10 includes a housing 16 designed to be held in the palm of the user. Internal components of the pipettor (not shown) drive a piston that extends through a seal assembly to displace air within an aspiration and dispensing cylinder. The tip mounting shaft 12 is threaded or otherwise attached to the lower end of the pipettor 10 such that it is in fluid communication with the aspiration and dispensing chamber. The attachment of the mounting shaft 12 to the pipettor is not particularly relevant to the concepts of the invention, and is well known in the art. Run button 18 is provided for the user to instruct the pipettor to aspirate and dispense. The pipettor 10 also includes a lever or ejection button 20 that is actuated in the direction of arrow 22 to move an ejection mechanism sleeve 24 downward in order to eject the disposable pipette tip 14 from the mounting shaft 12.

While the invention is shown and described with respect to its use on a single-channel handheld, electronic air displacement pipettor 10, the invention is also useful in connection with tips for other types of handheld pipettors, including multi-channel handheld pipettors, as well as automated liquid handling systems using disposable pipette tips and semi-automated liquid handling machines using disposable pipette tips. The ergonomic features provided by the invention are particularly useful for handheld manual pipettor as well as electronic pipettors. However, features of the invention that relate to the security and stability of the engagement of the pipette tip to the mounting shaft are quite useful for automated liquid handling systems as well as handheld pipettors.

Figure 2:
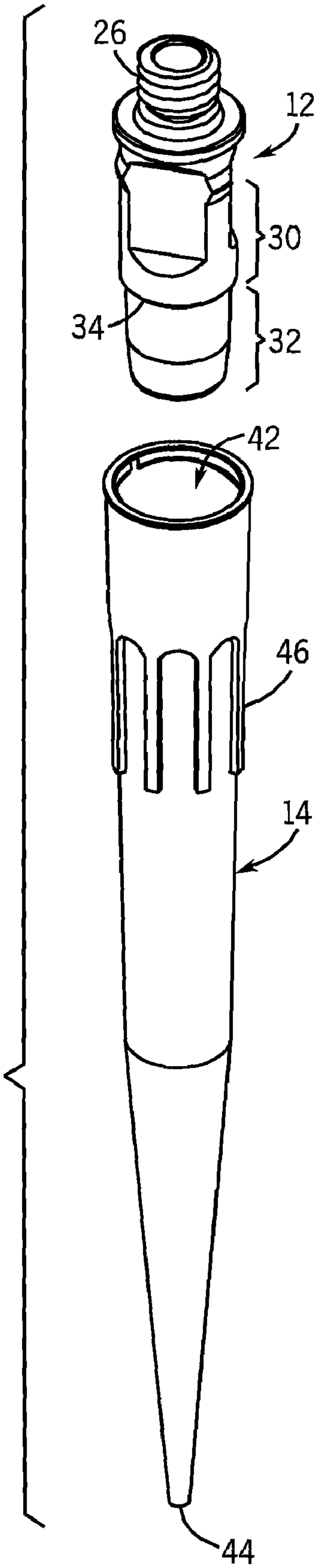
FIG. 2 is a perspective view showing a disposable pipette tip and pipette tip mounting shaft in accordance with one preferred embodiment of the present invention.

As shown in FIG. 2, the mounting shaft 12 preferably has threads 26 for attaching the mounting shaft 12 to the lower end of the aspiration and dispensing cylinder (not shown). As discussed herein, the dimensions of the mounting shaft 12 preferably match the dimensions of the pipette tip 14 so that only pipette tips 14 with the proper dimensions can fit onto the mounting shaft 12. In order to use pipette tips with different bore dimensions in the collar and sealing region, it is necessary to replace the mounting shaft 12 and/or the tubular stripper shaft sleeve 24 with one having appropriate dimensions.

Referring now in general to FIGS. 2-6, the mounting shaft 12 contains a central bore 28 that provides for air passage between the aspiration and dispensing cylinder in the pipettor 10 and the pipette tip 14, as is well known in the art. The mounting shaft 12 includes an upper locking section 30, a lower sealing section 32 and stop member 34 located between the locking section 30 and the lower sealing section 32. The pipette tip 14 generally consists of a collar 36, a barrel 38 and circumferential shelf 40 (e.g. FIGS. 4 and 5) that extends around the inside bore of the tip 14 and connects the lower end of the collar 36 to the upper end of the barrel 38. The upper end of the collar 36 has an opening 42 to receive the pipette mounting shaft 12. The lower end of the barrel 38 has a small opening 44 through which liquid is aspirated into the tip barrel 38 and dispensed from the tip barrel 38 during normal operation of the pipettor 10. Support ribs 46 extend downward on the outside surface of the disposable pipette tip 14 from the collar 36. The support ribs 46 function to hold the tip 14 or an array of tips 14 in a rack or the like for subsequent use, as is also known in the art. The present invention is directed to the configuration of the locking section 30, and in particular to the configuration of the outwardly extending locking lobes 50 and the recessed areas 58 (see, e.g. FIG. 6) spanning between the locking lobes 50. Generally speaking, the preferred configuration for the disposable pipette tip 14 is the same as described in the above incorporated patent applications, namely U.S. application Ser. No. 11/552,384, now U.S. Pat. No. 7,662,343 and U.S. application Ser. No. 11/938,381, now U.S. Pat. No. 7,662,344. Reference should therefore be made to these incorporated patent applications for details regarding aspects of the disposable pipette tip 14 which are not specifically addressed herein.

The preferred configuration of the pipette tip 14 is described briefly now in reference to FIG. 5. The inside surface of the collar 36 of the pipette tip 14 preferably includes a circumferential locking ring 48. The locking ring 48 is preferably located at or slightly below the opening 42 in the collar 36 through which the mounting shaft 12 is inserted. The locking ring 48 extends inward from the inside wall of the collar 36 a slight amount, preferably in the range of 0.001" to 0.010", in order to provide an over-center locking fit over the peak 61 of the lobes 50 on the mounting shaft 12. The locking ring 48 can contain an optional air bleed 52 although such an air bleed is not necessary in most circumstances because the distortion of the collar 36 when the tip is mounted should normally provide sufficient clearance over the recessed areas 58. As mentioned in the previously incorporated patent applications, the inside surface of the collar 36 is preferably tapered or slightly frustoconical, but can also be cylindrical. The preferred taper is between 0° and 10°. In any event, horizontal cross-sections through the main section of the collar 36 are preferably circular.

As also described in the above-incorporated patent applications, the upper portion 39 of the barrel 38 is preferably the sealing area for the pipette tip 14. In one embodiment (FIG. 5), a circumferential sealing ring 54 extends inwardly from the inner surface of the upper portion 39 of the barrel 38. Alternatively, in other embodiments, effective sealing can be accomplished without a sealing ring 54 extending inward from the inside surface of the tip barrel. The circumferential shelf 40 of the pipette tip 14 connects the lower portion of the collar 36 to the upper portion 39 of the barrel 38. The shelf 40 as shown in FIG. 5 is angular and continuous around the inside circumference of the tip 14. The shelf 40 need not be angular, however, and can be horizontal. The circumferential shelf 40 provides structural integrity that serves to separate and isolate the collar 36 from the sealing area 39 in the tip barrel 38. As is best illustrated in FIG. 11, the collar 36 is distorted out-of-round when the mounting shaft 12 is fully inserted into the pipette tip 14. The circumferential shelf 40 of the tip isolates the sealing area 39 in the upper portion of the tip barrel 38 from this distortion, thereby maintaining the roundness of the barrel 38 and facilitating an effective seal between the pipette tip 14 and the mounting shaft 12 below the shelf 40. The circumferential shelf 40 also serves to accurately locate the tip on the mounting shaft 12 inasmuch as the stop 34 on the mounting shaft 12 engages the circumferential shelf 40 on the tip 14 when the tip 14 is fully mounted to the mounting shaft 12. With multi-channel devices, the tip shelf 40 ensures the same vertical mounting distance from tip to tip, which facilitates precise and consistent tip positioning during pipetting.

As mentioned, the present invention is directed to modifications in the locking section 30 of the mounting shaft 12. One preferred embodiment of the mounting shaft 12 is now described in reference to FIGS. 2, 3, 4 and 6. The locking section 30 of the mounting shaft 12 preferably includes a central cylindrical stabilizing section 56, which is located immediately above and adjacent the stop member 34. When the pipette tip 14 is mounted on the mounting shaft 12, the central cylindrical stabilizer section 56 on the mounting shaft 12 helps to support the tip in a stable straight orientation. The diameter of the mounting shaft 12 decreases (e.g., steps down) at the stop member 34 between the central stabilization section 56 above the stop 34 and the sealing section 32 below the stop 34. The reduction in shaft diameter at the stop 34 is generally commensurate with the reduction in diameter of the matching pipette tip 14 at its circumferential shelf 40. This reduction is preferably in the range of about 0.004 to 0.040". It is not necessary that the cylindrical stabilizing section 56 and the stop member 34 be continuous around the circumference of the mounting shaft 12 inasmuch as the purpose of these components is to provide secure, stable locking engagement of the pipette tip 14 on the mounting shaft 12 and not to provide a seal. In this regard, the configuration of the mounting shaft 12 is similar to that disclosed in the above incorporated patent applications.

Above the cylindrical stabilization section 56, the diameter of the mounting shaft 12 may or may not reduce slightly in order to provide clearance between the mounting shaft 12 and the collar of the pipette tip 14. Un the drawings, there is not reduction in diameter for the portions of the mounting shaft aligned with the locking lobes 50. As mentioned, the top of the locking section 30 of the mounting shaft 12 includes two or more locking lobes 50 circumferentially spaced evenly around the mounting shaft 12, as well as corresponding recessed areas 58 spanning between the locking lobes 50. The lobes 50 include relatively gently sloping inclining ramps 60. The preferred slope of the inclining ramp 60 with respect to the vertical axis of the mounting shaft is between 10° and 20°. The lobes 50 angle outward as the inclining ramp 60 extends towards a peak portion 61 of the lobe 50. Each lobe 50 also includes a declining ramp 62 which slopes inward as the declining ramp 62 extends upward away from the peak portion 61. Preferably, the inward slope of the declining ramp 62 is the same as the outward slope of the inclining ramp 60, although such symmetry is not necessary. The peak portion 61 is preferably curved and has a radius of between 0.006 and 0.015 inches. At the peak portion 61, the lobes 50 preferably extend outward beyond the outer surface of the cylindrical stabilization section 56, although the exact preferred dimensions will depend on the amount of taper of the collar 36 in the corresponding matching pipette tip as well as the tip wall thickness. It is preferred that the mounting shaft 12 be made of polished stainless steel in order to reduce rough edges and reduce friction.

Preferably, the recessed portions 58 between the lobes 50 consume a substantial portion of the circumference of the mounting shaft 12 both at the peak portion 61 and along the declining ramp 62 where the locking ring 48 on the pipette tip 14 would normally engage once the mounting shaft 12 is fully inserted into the pipette tip 14. In accordance with the preferred embodiment of the invention, the lobes 50 at the peak portions 61 consume less than 15% of the mounting shaft circumference. The narrow locking lobes 50 reduce friction associated with mounting and ejecting pipette tips 14. Note that the recesses 58 preferably extend downward along the mounting shaft 12 below the height of the lobes 50 in order to accommodate inward distortion of the tip collar 36 when the tip is mounted to the mounting shaft 12.

Referring now to FIG. 7-9, as the mounting shaft 12 is pushed into the tip 14, the first point of contact is when the leading edge of the mounting shaft 12 enters through the circumferential shelf 40 on the pipette tip and contacts the pipette tip barrel 38. As the mounting shaft 12 is further inserted into the tip, the mounting shaft 12 and the pipette tip 14 enter into sealing engagement. At or near the same time, the inclining ramp 60 of the locking lobes 50 begins to engage the upper portion of the tip collar 36. As the mounting shaft 12 is further inserted into the tip, the inclining ramp 60 on the lobes 50 push against the locking ring 48 on the tip collar 36 to gently flex the collar 36 and distort it out-of-round. The recessed areas 58 on the mounting shaft 12 provide ample clearance for the straightening of the collar 36 that occurs between the lobes 50. The intent is for the lobes 50 on the mounting shaft 12 to flex the collar out-of-round rather than to stretch the collar 36 on the mounting shaft 12.

Referring now to FIGS. 10 and 11, as the mounting shaft 12 is fully inserted into the pipette tip collar 36, the stop member 34 on the mounting shaft engages the circumferential shelf 40 on the pipette tip 14, thus preventing further movement of the shaft into the tip 14. At the point of engagement, the locking ring 48 on the inside surface of the tip collar 36 more or less simultaneously slides over the peak portion 61 of the lobes 50 on the mounting shaft 12 such that the locking ring 48 engages the declining ramp portion 62 of the lobe 50. Thus, the pipette tip 14 is securely locked into place on the mounting shaft 12 with there being a positive engagement between the stop member 34 on the mounting shaft 12 and the circumferential shelf 40 on the pipette tip 14 on one hand; and, the declining ramp portion 62 of the lobes 50 on the mounting shaft 12 and the underside of the locking ring 48 on the tip collar 36 on the other hand. FIG. 11 shows a cross-sectional view looking down on the tip collar 36 being locked onto the mounting shaft 12 over the lobes 50. The collar 36 is flexed and distorted to an out-of-round condition. Note that phantom line 70 indicates the outside surface of the collar opening in its preferred round state before being mounted on the mounting shaft 12. The phantom line 72 indicates the position of the inside surface of the locking ring 48 on the collar 36 in its preferred round state before being mounted over the lobes 50 on the mounting shaft 12. While the mounted collar 36 is flexed and distorted out-of-round, the circumferential shelf 40 below the collar 36 remains circular due to its structural integrity.

By flexing and distorting the tip collar 36 rather than stretching the collar 36 in order to mount the tip 14, the required insertion force is relatively small as compared to tip mounting configurations which require tight interference fits or stretching of the tip collar. In addition, the required insertion forces are reduced somewhat over the configuration disclosed in the incorporated patent applications due to the reduced width of the lobes 50 which in turn reduces friction during insertion. Nonetheless, the user receives definite tactile feedback that full engagement has occurred when the stop member 34 engages the circumferential shelf 40 on the tip and the locking ring 48 on the tip slides over the lobes 50. The locking engagement is robust and prevents unintentional demounting of the tip when a side force is applied to the tip, such as during a touching off procedure.

Figure 12:
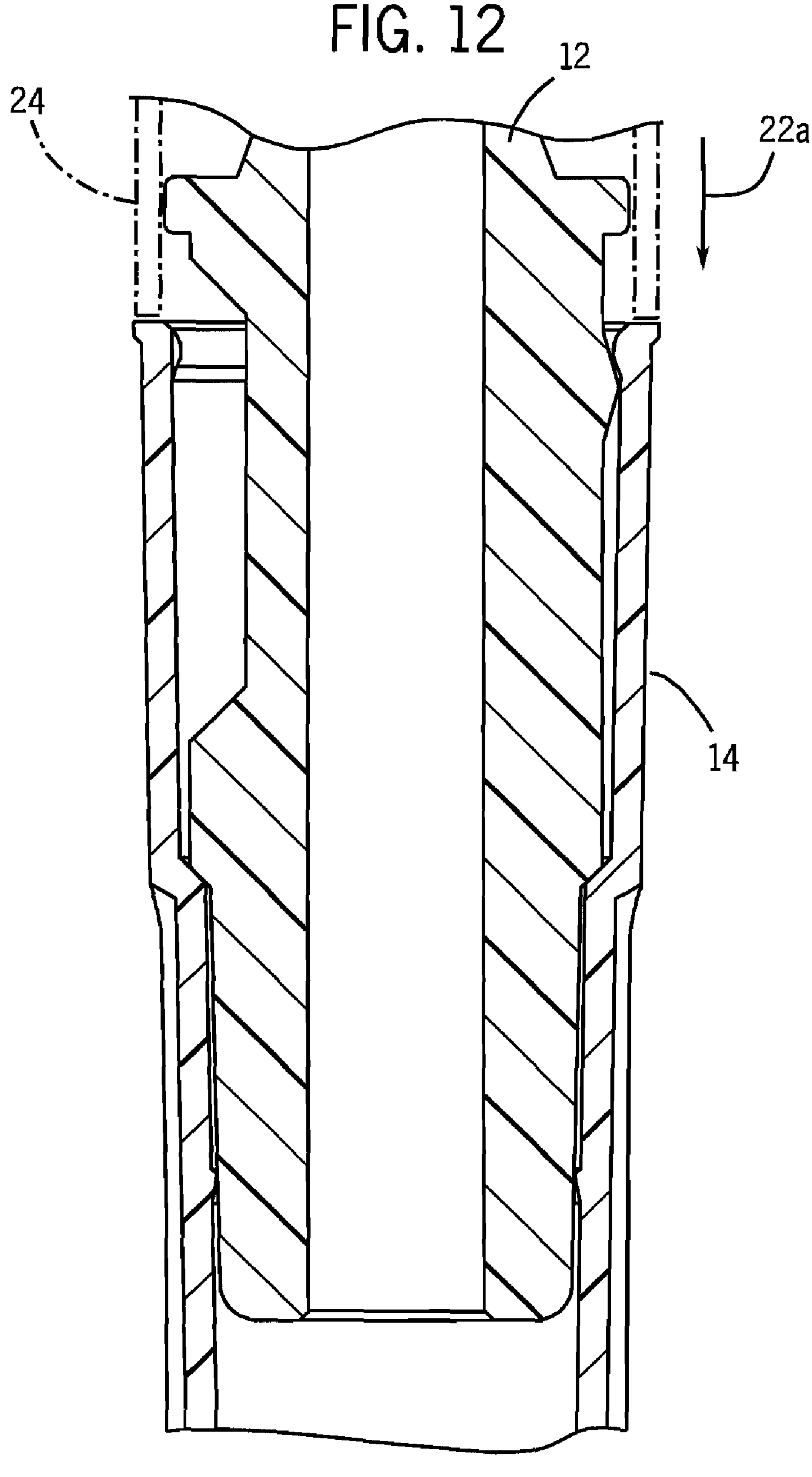
FIG. 12 is a view similar to FIG. 10 illustrating the pipette tip being ejected from the mounting shaft.
Figure 13:
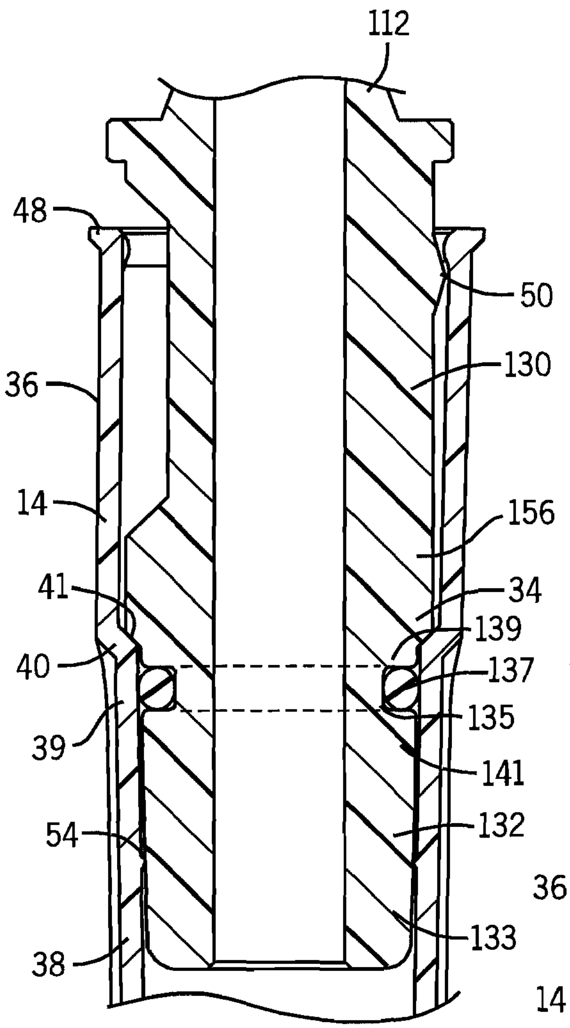
FIG. 13 is a detailed view similar to FIG. 10 showing full insertion of a mounting shaft into the pipette tip, wherein the mounting shaft has been modified to include an annular groove and an O-ring seal in accordance with another embodiment of the invention.

One of the primary advantages of the present invention is that the design of the locking lobes 50 enables the use of substantially lower ejection forces, which is particularly advantageous for handheld pipettors and multi-channel handheld pipettors. Since the locking ring 48 on the tip collar 36 engages the declining ramp portion 60 of the locking lobes 50 just beyond the curved peak portion 61, the present invention requires less ejection force than the previous design with the abrupt catch surface described in the above incorporated pending patent applications. Referring to FIG. 12, a stripping sleeve 24 is shown moving downward (arrow 22*a*) to push on the top of the collar 36 to eject the tip 14, as is common in the art. Once the locking ring 48 clears the peak portion 61 on the lobes 50, energy stored in the distorted collar 36 is released and facilitates efficient ejection of the tip 14 from the mounting shaft 12. Testing has shown that the use of lobes 50 with a gently sloped declining ramp 62 and a curved peak portion 61 connecting an inclining ramp 60 to the declining ramp 62 greatly reduces the required ejection force, yet provides ample lateral stability. The inventors collected data comparing the change in insertion forces and ejection forces due to the dual-ramp lobe design for various sized, polished steel mounting shafts. For a 12.5 μl non-sterile tip, the average insertion force was reduced from about 2.5 lbs. to 1.4 lbs. whereas the average ejection force was reduced from about 2 lbs. to about 1.1 lbs. For a 125 μl mounting shaft, the average insertion force was reduced from about 2.1 lbs. to about 2 lbs., and the ejection force was reduced from about 2.4 lbs. to about 1.6 lbs. For a 1250 μl mounting shaft, the average insertion force was reduced from about 2 lbs. to about 1.7 lbs., and the average ejection force was reduced from about 2 lbs. to about 1.4 lbs. In all cases, the tips remained stable on the mounting shaft with the dual-ramp lobe configuration, and in sealing engagement on the mounting shaft, even in the presence of relatively substantial lateral forces on the pipette tip. The data indicates that ejection forces are reduced substantially to very low levels with the dual-ramp, locking lobe configuration without sacrificing tip stability.

FIGS. 13-16 show additional embodiments of mounting shafts 112, 212 configured in accordance with the present invention. The mounting shaft 112 shown in FIG. 13 has a modified lower sealing section 132, but the configuration of the locking section 130 of the modified mounting shaft 112 is the same or similar to that described in the earlier embodiment, especially with respect to the dual-ramp lobes 50, the step 34 and the interaction of the lobes 50 and the step 34 with the pipette tip. The lower sealing section 132 of the mounting shaft 112 in FIG. 13 has a reduced diameter so that there is little or no interference between the circumferential ring 54 on the pipette tip and the lower portion 132 of the mounting shaft as described in the above incorporated U.S. patent application Ser. No. 11/934,381. An annular groove 135 containing a sealing ring 137 is located at the upper end of the lower sealing section 132 of the mounting shaft 112. The sealing ring 137 is preferably an O-ring made of fluoroelastomeric material, as also described in the above incorporated U.S. patent application Ser. No. 11/934,381. In this embodiment, the O-ring 137 seals against the inside surface of the upper portion 39 of the tip barrel 38. Note that the lower section 132 of the mounting shaft 112 preferably includes a tapered portion 141 which serves to protect the O-ring seal 137 from damage that might otherwise be caused by contact with the pipette tip shelf 40 when the mounting shaft 112 is inserted into the pipette tip 14. In the embodiment shown in FIG. 13, the ring 54 on the tip barrel 38 serves as a stabilization ring rather than a sealing ring. While not generally preferred, it may be desirable in some circumstances to locate the groove 135 and O-ring seal 137 within the upper locking portion 130 of the mounting shaft, so that the O-ring seal 137 engages the collar 36 of pipette tip 14.

Figure 14:
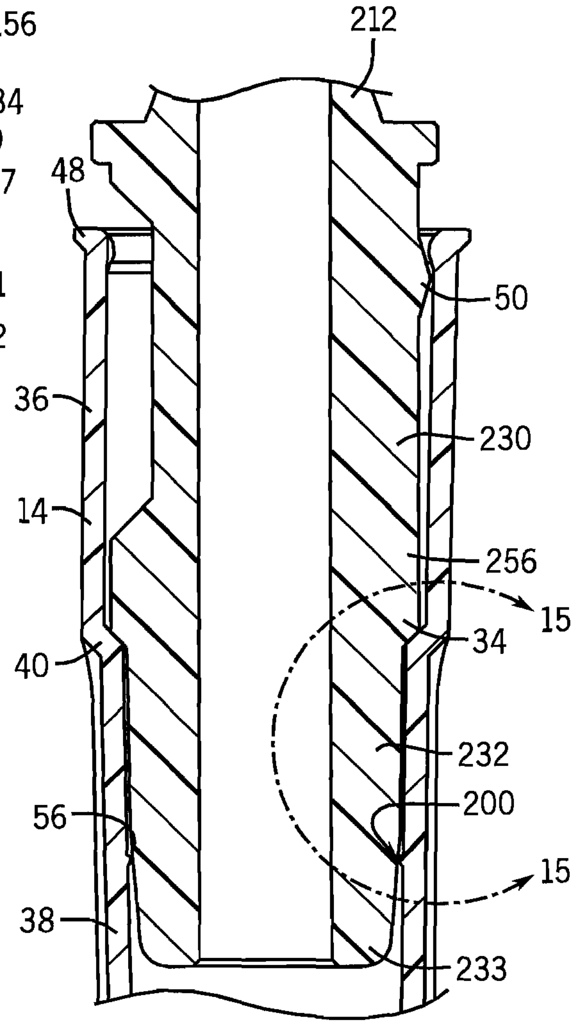
FIG. 14 is a detailed view showing the full insertion of a mounting shaft into the pipette tip, wherein the mounting shaft has been modified in accordance with another embodiment of the invention to incorporate a frustoconical sealing area.
Figure 15:
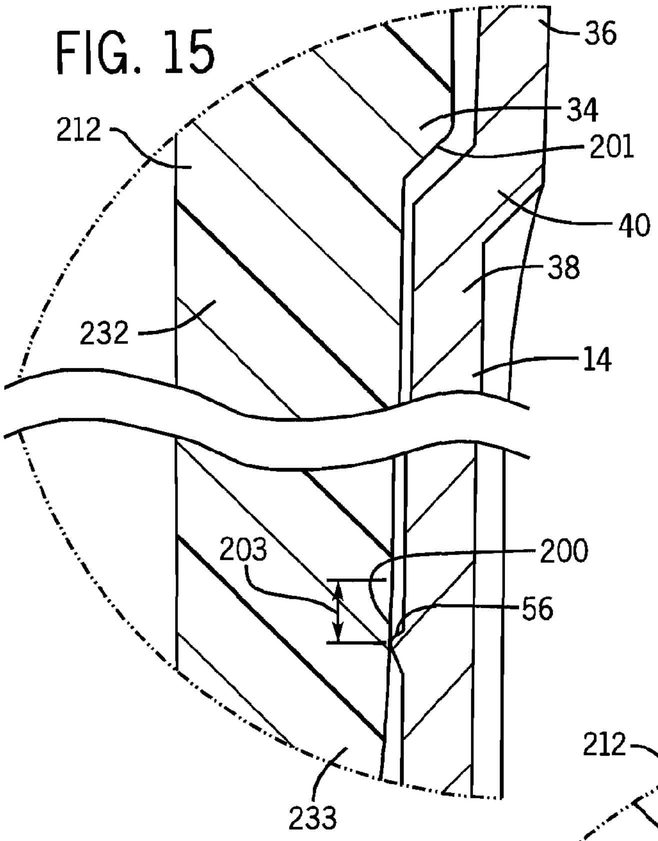
FIGS. 15 and 16 are schematic views of the area depicted in line 15-15 in FIG. 14, illustrating the interaction between the circumferential sealing ring on the pipette tip and the frustoconical sealing area on the pipette mounting shaft.
Figure 16:
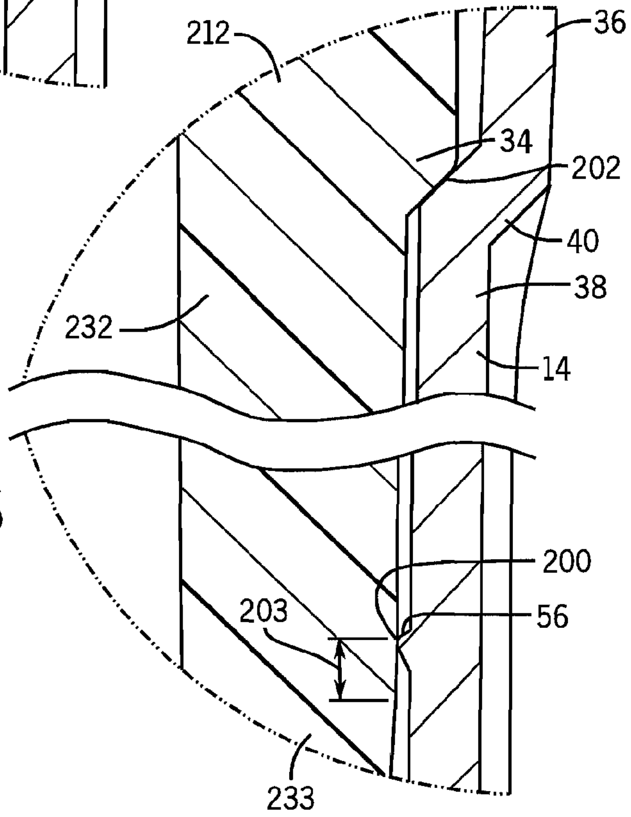

FIGS. 14-16 illustrate another version of a pipette tip mounting shaft 212 incorporating the dual-ramp locking lobes 50 in accordance with the present invention. In FIGS. 14-16, the lower sealing section 232 of the mounting shaft 212 is modified as described in accordance with description of FIGS. 14-16 in U.S. patent application Ser. No. 11/934,381. Briefly, the diameter of the lowermost portion 233 of the mounting shaft 212 is reduced so that there is little or no interference between the circumferential sealing ring 56 on the pipette tip 14 and the lowermost portion 233 on the mounting shaft. The lower section 232 of the mounting shaft 212 contains a frustoconical sealing area 200 located in the vicinity where the circumferential sealing ring 56 is expected to engaged when the mounting shaft is fully inserted into the tip 14. FIGS. 15 and 16 are schematic views illustrating the operation of the frustoconical sealing area 200 on the mounting shaft 212. It should be understood that the dimensions of the frustoconical sealing area 200 are exaggerated in FIGS. 15 and 16 in order to better illustrate this aspect of the invention. As the pipette tip is mounted onto the mounting shaft 212, an interference fit occurs between the circumferential sealing ring 56 and the pipette tip 14 in the frustoconical sealing area 200 on the mounting shaft. The specific dimensions of the frustoconical sealing area 200 are determined to account for normal manufacturing tolerances for molded pipette tips. Below the frustoconical sealing area 200, it is desirable that the mounting shaft 212 does not interfere with the sealing ring 56 as the mounting shaft 212 is inserted into the pipette tip. In FIG. 15, there is a slight amount clearance between the step 34 on the mounting shaft 212 and the circumferential shelf 40 between the collar 36 and the barrel 38 of the pipette tip 14, indicating that the mounting shaft 212 is not yet fully inserted into the tip 14. On the other hand, in FIG. 16, there is no such clearance 201 as shown in FIG. 15, but the step 34 on the mounting shaft 212 engages the circumferential shelf 40 on the barrel 38 of the pipette tip 14 as illustrated by reference number 202. The preferred dimensions of the frustoconical sealing area 200 including the preferred vertical range of travel 203 and the preferred desired conical angle are described in detail in the above referenced incorporated patent application.

It should be understood by those skilled in the art that while preferred embodiments of the invention have been described in connection with the drawings, various aspects and features of the invention can be implemented in other forms. For example, it is not necessary that the mounting shaft have more than two lobes. Also, it should be understood that the portion of the declining ramp 62 that resides above the location where the locking ring 48 would normally engage the lobes 50 when the tip 14 is fully mounted on the mounting shaft 12, 112, 212 is somewhat non-functional. Therefore, in accordance with the invention, the declining ramp 62 may be constructed as a partial ramp if desired.

As mentioned previously, although it is not preferred, it may be desirable in some circumstances to move the sealing area on the pipette tip from below the circumferential shelf 40 on the tip 14 to above the shelf 40, and configure the mounting shaft to accommodate sealing above the stepped stop rather than below. Even though such a design is not preferred when implementing the invention, those skilled in the art will recognize that the locking lobes described in accordance with the present invention may be incorporated into such a tip mounting shaft. In such a case, it is important that the sealing area on the tip remain sufficiently protected from distortion. This would normally require that the sealing area on the collar be located adjacent the shelf and relatively far from the upper portion of the collar, which becomes distorted by the locking lobes on the mounting shaft.

Moreover, while the preferred embodiment of the invention has been shown in the drawings for use in connection with a single channel handheld pipettor, the invention is also quite useful for multi-channel handheld pipettors as well as automated liquid handling systems and semi-automated liquid handling systems.

What is claimed is:

1. A pipette system comprising:

disposable pipette tip having barrel with a lower opening through which liquid is aspirated into in the barrel and dispensed from the barrel, a collar having an upper opening for receiving a pipette tip mounting shaft, wherein the lower end of the collar has a larger inside diameter than the inside diameter at the upper end of the barrel, and a circumferential shelf that connects the lower end of the collar to the upper end of the barrel; and a pipette tip mounting shaft including an upper locking section, the locking section of the mounting shaft including a stop that engages the shelf of a pipette tip when the mounting shaft is fully inserted into the collar of the pipette tip, two or more outwardly extending lobes circumferentially spaced around the upper locking section of the mounting shaft and located above the stop on the mounting shaft for engaging the inside surface of the collar, and recessed relief portions spanning between the lobes and recessed relative to the lobes such that the collar distorts outwardly at the lobes and inwardly at the relief portions when the pipette tip is mounted on the mounting shaft over the stop and the lobes;

wherein each lobe includes a peak portion that is located at a maximum outward distance from a longitudinal axis of the mounting shaft, an inclining ramp portion that slopes outward as the inclining ramp extends upward along the mounting shaft towards the peak portion in order to facilitate distortion of the pipette tip collar as the mounting shaft is inserted into the pipette tip, and a declining ramp portion that slopes inward as the declining ramp extends upward along the mounting shaft away from the peak.

2. A pipetting system as recited in claim 1 wherein the inside surface of the collar includes a substantially circumferential locking element extending inward from an inside surface of the collar, which engages the declining ramp portion of the two or more outwardly extending lobes on the mounting shaft when the pipette tip is fully mounted on a pipette mounting shaft.

3. A pipetting system as recited in claim 1 wherein the peak portion of the respective lobes is curved.

4. A pipetting system as recited in claim 3 wherein the radius of the curved peak portion is between 0.006 and 0.015 inches.

5. A pipetting system as recited in claim 1 wherein the magnitude of the slope angle of the inclining ramp portion is substantially the same as the magnitude of the slope angle of the declining ramp portion.

6. A pipetting system as recited in claim 1 wherein the declining ramp portion is a partial ramp extending upward beyond a location where the collar on the pipette tip will be positioned when it is fully mounted on the mounting shaft.

7. A pipetting system as recited in claim 1 wherein the pipette tip mounting shaft has a lower sealing section below the stop which engages an upper end of the tip barrel in order to seal the tip against the mounting shaft.

8. A pipetting system as recited in claim 7 wherein the lower sealing section of the mounting shaft has annular groove and a sealing ring residing in the groove, wherein the sealing ring engages the upper end of the tip barrel when the mounting shaft is fully inserted into the pipette tip.

9. A pipetting system as recited in claim 8 wherein:

the inside surface of the pipette tip barrel includes an inwardly extending, circumferential ring below the circumferential shelf; and the locking section on the mounting shaft engages the upper end of the tip barrel at a location above the circumferential ring when the mounting shaft is fully inserted into the pipette tip.

10. A pipetting system as recited in claim 9 wherein the diameter of the lower section on the mounting shaft below the groove is less than above the groove thereby avoiding interference between the mounting shaft and the circumferential ring on the pipette tip.

11. A pipetting system as recited in claim 1 wherein the tip barrel includes a circumferential sealing ring extending inward from an inside surface of the barrel below the circumferential shelf, and the pipette tip mounting shaft includes a lower sealing section with a frustoconical portion that provides an interference fit with the circumferential sealing ring on the pipette tip when the tip is fully mounted on the mounting shaft.

12. A pipetting system as recited in claim 1 wherein the mounting shaft has three lobes for engaging an inside surface of the collar.

13. A pipetting system as recited in claim 1 wherein the system includes multiple pipette mounting shafts, each in accordance with the limitations recited in claim 1 for the pipette mounting shaft.

14. A pipetting system as recited in claim 1 wherein at the peak portion of the respective lobes, the lobes comprise no more than 15% of the circumference of the mounting shaft, the remaining portion of the circumference of the mounting shaft being consumed by the relief portions spanning between the lobes.

15. A pipetting system as recited in claim 1 wherein the mounting shaft is made of polished steel.

16. A pipetting system as recited in claim 1 wherein the inclining ramp portions of the locking lobes slope outward between 10-20° with respect to a vertical axis of the mounting shaft, and the declining ramp portions of the locking lobes slope between 10-20° with respect to the vertical axis of the mounting shaft.

17. A pipette system including a pipette tip mounting shaft comprising:

an upper locking section including a stop for engaging a shelf in a pipette tip collar, two or more outwardly extending lobes circumferentially spaced around the upper locking section of the mounting shaft and located a predetermined distance above the stop on the mounting shaft, and recessed relief portions spanning between the lobes and recessed relative to the lobes such that a pipette tip collar distorts outwardly at the lobes and inwardly at the relief portions when the pipette tip is fully mounted on the mounting shaft;

wherein each lobe includes a peak portion that is located at a maximum outward distance from a longitudinal axis of the mounting shaft, an inclining ramp portion that slopes outward as the inclining ramp extends upward along the mounting shaft towards the peak portion in order to facilitate distortion of the pipette tip collar as the mounting shaft is inserted into the pipette tip, and a declining ramp portion that slopes inward as the declining ramp extends upward along the mounting shaft away from the peak.

18. A pipetting system as recited in claim 17 wherein the inclining ramp portions of the locking lobes slope outward between 10-20° with respect to a vertical axis of the mounting shaft, and the declining ramp portions of the locking lobes slope between 10-20° with respect to the vertical axis of the mounting shaft.

19. A pipetting system as recited in claim 17 wherein the declining ramp portion is a partial ramp extending upward beyond a location where the collar on the pipette tip will be positioned when it is fully mounted on the mounting shaft.

* * * * *